(12) United States Patent
Knobel

(10) Patent No.: US 7,922,476 B2
(45) Date of Patent: Apr. 12, 2011

(54) DEVICE FOR THE PRODUCTION OF CONFECTIONERY

(75) Inventor: Giudo Knobel, Felben (CH)

(73) Assignee: KMB Produktions AG, Felben (CH)

(*) Notice: Subject to any disclaimer, the term of this patent is extended or adjusted under 35 U.S.C. 154(b) by 213 days.

(21) Appl. No.: 11/912,156

(22) PCT Filed: Mar. 27, 2006

(86) PCT No.: PCT/EP2006/002770
§ 371 (c)(1),
(2), (4) Date: Jan. 24, 2008

(87) PCT Pub. No.: WO2006/111244
PCT Pub. Date: Oct. 26, 2006

(65) Prior Publication Data
US 2008/0171099 A1    Jul. 17, 2008

(51) Int. Cl.
*A23G 7/00* (2006.01)

(52) U.S. Cl. ........ 425/395; 425/408; 425/422; 426/514; 426/515

(58) Field of Classification Search .......... 425/422, 425/443, 547, 394–398, 408; 426/512, 514, 426/515
See application file for complete search history.

(56) References Cited

U.S. PATENT DOCUMENTS

| | | | | |
|---|---|---|---|---|
| 4,167,388 A | * | 9/1979 | Keelor et al. | 425/387.1 |
| 4,273,738 A | * | 6/1981 | Spengler | 425/195 |
| 4,352,830 A | * | 10/1982 | Billett et al. | 425/436 R |
| 5,635,230 A | * | 6/1997 | Aasted | 425/262 |
| 6,268,006 B1 | * | 7/2001 | Knobel | 426/515 |
| 6,497,568 B1 | * | 12/2002 | Aasted | 425/547 |
| 2006/0057265 A1 | | 3/2006 | Knobel | |

FOREIGN PATENT DOCUMENTS

| | | |
|---|---|---|
| DE | 4128905 | 3/1992 |
| DE | 19732036 | 1/1999 |
| EP | 0914774 | 5/1999 |
| EP | 1300086 | 4/2003 |
| WO | 9749296 | 12/1997 |

* cited by examiner

*Primary Examiner* — Richard Crispino
*Assistant Examiner* — Thu Khanh T Nguyen
(74) *Attorney, Agent, or Firm* — Bachman & LaPointe, P.C.

(57) ABSTRACT

A device for the production of confectionery, in particular, pralines, in moulds, with at least one upper die which may be lowered relative thereto, mounted on a die plate whereby the die plate has a flexible mounting.

4 Claims, 1 Drawing Sheet

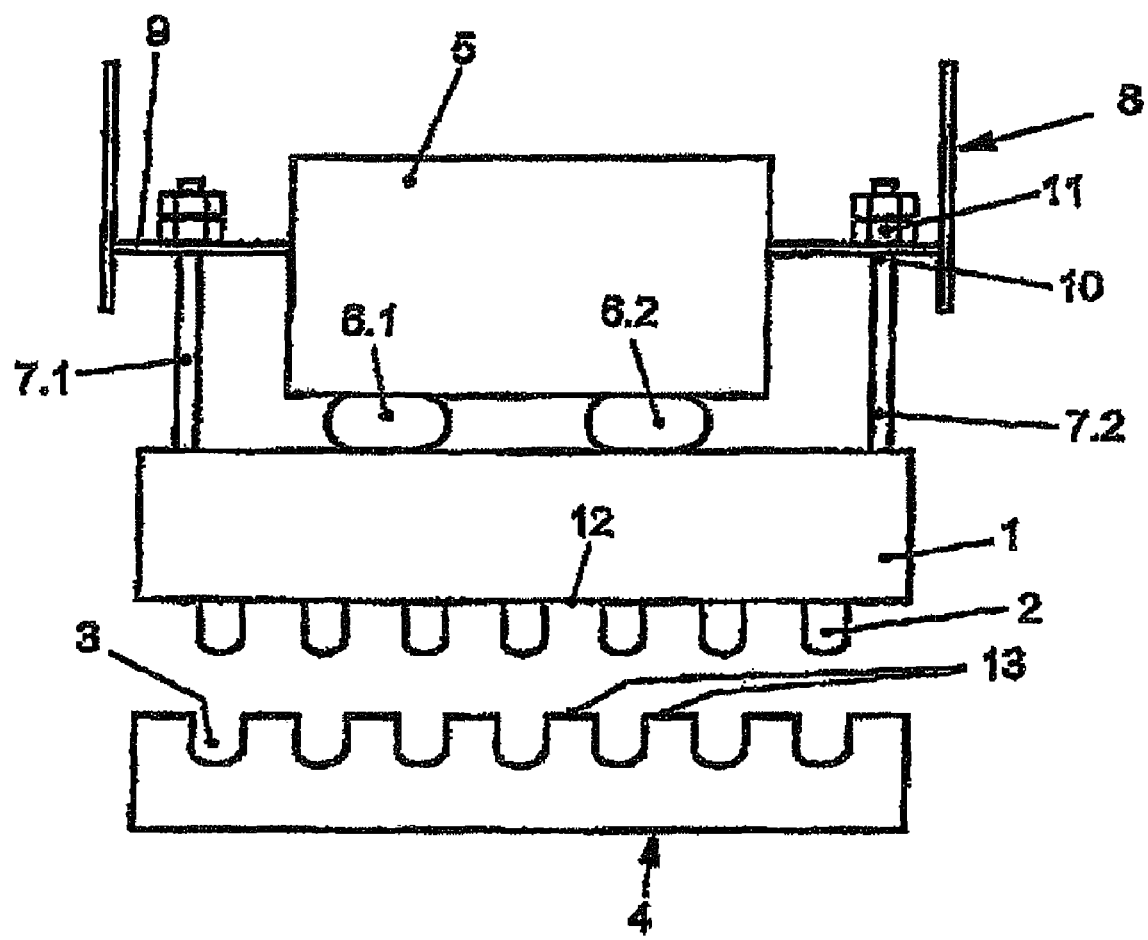

DEVICE FOR THE PRODUCTION OF CONFECTIONERY

BACKGROUND OF THE INVENTION

The invention relates to a device for the production of confectionery, in particular pralines, in molds, against which at least one die on a die plate can be lowered.

Pralines or similar confectionery are today generally produced in molds. In order for example to produce an outer shell of a praline from chocolate, which is then provided with a filling, liquid chocolate is filled into impressions of a mold and then a cooled die or a plurality of cooled dies on a die plate is/are lowered onto this mold, so that the dies enter the liquid chocolate, give the chocolate a desired form and at the same time contribute to more rapid solidifying of the chocolate. A corresponding method and a device of this type are described in DE 197 32 036.8 A1.

Furthermore, DE 41 28 905 A1 discloses a device for the production of confectionery in which dies are fastened in a vertically elastically movable manner to a die carrier unit. The die carrier unit itself is pivotably mounted by means of lateral rockers.

However, problems arise when there are unevenesses of the mold or unevenesses of the supporting surface for the mold. Since the molds are in many cases produced from plastic, warpage may occur, since the molds are subjected to considerable differences in temperature when they are filled with warm chocolate. As a result the molds often warp, so that they are uneven. If the dies are then lowered on a die plate, often shells with different wall thicknesses are produced, which is undesired.

The object of the invention is to make the production of confectionery products, of no matter what form, more uniform and to make the entire production operation easier.

SUMMARY OF THE INVENTION

Vertically flexible mounting of the die plate and the adaptability of the orientation of its die face to a surface of the mold leads to the object being achieved.

The flexible mounting of the die plate makes it possible for it to yield to a distortion or a warpage of the mold, with the result that much more uniform products can be produced than was previously possible. Although the way in which the die plate impinges on the surface of the mold allows the die plate to press the mold flat again to a certain extent, this is also only desirable to a certain extent, since otherwise the impressions, which are likewise warped, are deformed too much. Therefore, the flexible elements are designed in such a way that they yield when a counteracting force of the mold is exceeded.

With preference, the die plate is supported by means of a compliant element against a fixed machine part. For example, this may be the manifold block for the cooling medium for the die.

Suitable in particular as compliant elements are rubber buffers, which easily recover their shape and are also very resistant to wear.

However, in order that the die plate does not hang on the rubber buffers, it is also additionally suspended by means of bolts on a machine frame, it being possible for the sake of simplicity for these bolts each to pass through a bore in the machine frame and slide in this bore. On the other hand, a nut is screwed onto the bolt, so that by means of the bolt, held by this nut, the die plate hangs on the carrier. The nut also makes it possible at same time to set the horizontal position of the die plate.

BRIEF DESCRIPTION OF THE DRAWINGS

Further advantages, features and details of the invention emerge from the following description of a preferred exemplary embodiment and with reference to the drawing which shows a schematic side view of a device for the production of confectionery.

DETAILED DESCRIPTION

A corresponding device is described for example in DE 197 32 036.8, particular reference being made to this application and this application also being incorporated in the present utility model application for the general description. There, as also in the case of the present application, a die plate 1 can be seen, on which a plurality of dies 2 are located. These dies 2 enter impressions 3 of a mold 4 when the die plate 1 is lowered, and can mold a mass of chocolate poured in there.

According to the invention, the die plate 1 hangs on a fixed machine part 5 and is supported with respect to this machine part 5 by means of rubber buffers 6.1 and 6.2.

Furthermore, the die plate 1 hangs by means of bolts 7.1 and 7.2 on a machine frame 8, each bolt 7.1, 7.2 passing through a bore (not shown any more specifically) in a carrier 9. At least the part of the bolt 7 passing through the bore has a thread, on which a nut 10 is screwed, fixed by a lock nut 11.

The way in which the present invention functions is as follows:

Liquid chocolate, for example, is introduced into the impressions 3 of the mold 4. The mold 4 passes, for example on a conveyor belt, under the die plate 1. To deform the mass of chocolate in the impressions 3, the die plate 1 is lowered, so that the dies 2 enter the impressions 3. In the end position, a die face 12 lies on a surface 13 of the mold 4. Should the conveyor belt, or a table under the die plate 1 on which the mold 4 is located, then happen to be uneven or the mold itself warped, there is no canting between the die plate 1 and the mold 4, since the die plate 1 gives way against the rubber buffers 6.1 and 6.2.

The bolts 7.1 and 7.2 have the task of holding the die plate 1, in order that the die plate 1 does not hang on the rubber buffers 6.1 and 6.2, whereby this connection may be permanently damaged. When the die plate 1 gives way, the bolts 7.1 and/or 7.2 move a little upward in the corresponding bore in the carrier 9, so that they do not oppose giving way of the die plate 1. If the entire apparatus is then raised again, the bolts 7.1 and 7.2 slide back into their starting position, the die plate 1 hanging on the corresponding nuts 10. Moreover, these nuts 10 also provide a very simple possibility for adjusting the die plate 1 with respect to the mold 4 and/or a table/conveyor belt.

The invention claimed is:
1. A device for the production of confectionery comprises a mold having a plurality of impressions,
a die plate arranged above the mold and provided with a plurality of dies,
means for moving the die plate against the mold such that the dies enter the impressions in order to deform a confectionery material in the impressions for bringing the at least one die into contact with the mold,
a fixed machine part located above the die plate wherein the die plate hangs freely from the fixed machine part, and elastic means comprising at least one rubber buffer located between and contacting both the fixed machine part and the die plate for compensating for canting of the mold so that there is no canting between the die plate and the mold.

2. The device as claimed in claim 1, wherein the elastic means comprises at least four rubber buffers provided in a rectangular form between the die plate and the means for moving the die plate.

3. The device as claimed in claim 1, wherein the die plate hangs by means of bolts on the fixed machine part.

4. The device as claimed in claim 3, wherein the bolts pass through a bore in a carrier and at the other end remote from the die plate means are mounted on the bolts to suspend the die plate from the fixed machine part.

* * * * *